United States Patent

Duque-Antón et al.

[11] Patent Number: 6,081,722
[45] Date of Patent: Jun. 27, 2000

[54] MOBILE RADIO TRANSMISSION SYSTEM WITH CHANNEL ALLOCATION, UTILIZING THE EXTENDED KOHONEN NETWORKS

[75] Inventors: Jesus-Manuel Duque-Antón; Dietmar W. Kunz, both of Aachen; Bernhard J. Rüber, Roetgen, all of Germany

[73] Assignee: U.S. Philips Corporation, New York, N.Y.

[21] Appl. No.: 08/553,472

[22] PCT Filed: Mar. 16, 1995

[86] PCT No.: PCT/IB95/00173

§ 371 Date: Jun. 24, 1996

§ 102(e) Date: Jun. 24, 1996

[87] PCT Pub. No.: WO95/25408

PCT Pub. Date: Sep. 21, 1995

[30] Foreign Application Priority Data

Mar. 16, 1994 [DE] Germany ............... 44 008 884

[51] Int. Cl.⁷ ........................................... H04B 7/00
[52] U.S. Cl. ............................... 455/452; 455/62
[58] Field of Search ...................... 455/422, 450, 455/451, 452, 453, 455, 62, 63, 67.3

[56] References Cited

U.S. PATENT DOCUMENTS 5,157,709  10/1992  Ohteru ............................... 455/63
5,475,868  12/1995  Duque-Anton et al. ............ 455/452

FOREIGN PATENT DOCUMENTS

0585994A2  3/1994  European Pat. Off. ......... H04Q 7/04

OTHER PUBLICATIONS

Networks for the Enterprise, NSTL Software Roundup Reviews, Feb. 1995.

Neurale Netze: Eine Einfuhrung in die Neuroinformatik Selbstorganisierender Netewerke by H. Ritter et al, Addison–Welsey 1990.

*Primary Examiner*—Thanh Cong Le
*Attorney, Agent, or Firm*—Dicran Halajian

[57] ABSTRACT

A radio transmission system having a base station and a mobile station is disclosed. A controller dynamically changes in real-time the allocation of channels in response to changes in signal propagation and traffic conditions between the base and mobile stations. The allocation of channels is based on use of a Kohonen model and is determined by a space-dependent component and/or a time-dependent component. The space-dependent component is determined by signal strengths received by the base and mobile stations and the time-dependent component are determined by activity of the channels.

21 Claims, 6 Drawing Sheets

MOBILE RADIO TRANSMISSION SYSTEM WITH CHANNEL ALLOCATION, UTILIZING THE EXTENDED KOHONEN NETWORKS

BACKGROUND OF THE INVENTION

The invention relates to a mobile radio transmission system with radio base stations and mobile stations.

Mobile radio transmission systems for covering a rather large radio coverage area have been conceived as cellular radio networks for a long time. Each cell of such a radio network comprises at least one radio base station that maintains a radio connection to the mobile stations located in its radio cell. To make the frequency band available for the radio system accessible to the largest possible number of subscribers in the whole mobile radio communications system, great importance is attributed to the radio network planning.

Channel allocation in a mobile radio network is then a difficult problem of the radio network planning. So far this has been solved by making forecasts in the planning phase about the expected traffic density and radio wave propagation. Such calculations then result in numbers of channels necessary for each radio base station and corresponding compatibility requirements of the individual radio base stations. Via suitable computing methods it is then possible to generate channel lists i.e. lists of channels which are to be installed in the radio base stations concerned from these necessary numbers of channels. The disadvantage of such a procedure is that the correctness of the data on which the planning is based is to be trusted and the planning is to be repeated with each change of the network. Especially in the microcell area, this procedure of planning of radio networks is almost inapplicable because, on the one hand, microcells by nature require a degree of detail that can no longer be effectively calculated beforehand and, on the other hand, microcells in a city area are subjected to permanent changes. For example, the shadowing properties of buildings are no longer modelled stochastically as they have been thus far, but the necessary accuracy of the field strength propagation cannot be effectively calculated in advance. On the other hand, for example building sites and traffic jams represent continuous changes of the network. However, since microcells have the only possibility of coping with the present or future dramatic increase of radio subscribers, on the whole the procedure of preliminary planning no longer seems to be practical.

From EP 0 585 994 A2 is known a mobile radio transmission system of the type defined in the opening paragraph.

SUMMARY OF THE INVENTION

It is an object of the invention to provide a possibility of how the channel allocation can be learnt while the network is in operation.

This object is achieved in a mobile radio communications system defined in the opening paragraph in that the mobile radio transmission system comprises means for allocating radio channels in dependence on the radio situation, while the channel allocation is based on the utilization of the Kohonen model.

The invention is then based on the recognition that in a planning step of the mobile radio transmission system it is no longer necessary to calculate the traffic density and compatibility information beforehand. The dynamically learnt channel allocation takes place on a microscopic level. Instead of allocating channel lists per radio base station, as has been done so far (macroscopic level), now a channel list is allocated for each channel situation. A radio situation is now defined by a space-dependent and a time-dependent component. The space-dependent component, the finding place, is determined by the vector of the signal strengths of all the radio base stations and may be interpreted as a sub-cell of the coverage area of a particular radio base station. The time-dependent component, the channel situation, is determined by the traffic of the channel activities of all the channels.

In addition, a real-time channel allocation component is proposed which, while utilizing the channel allocation learnt so far, allocates a channel to a current call in dependence on the current radio situation. It is then assumed that the radio channels of each radio base station allow of being reallocated without manual intervention. Besides, the fact is started from that before the network is put into operation, an initial channel allocation is performed. Since, by experience, the number of subscribers is rather low when the system is started, very strict requirements are not imposed on this initial channel allocation. It can be made to the occasion, or with the aid of the methods known thus far. An essential advantage of the invention is then found in the increase of the traffic capacity of the network as well as in the enhancement of its operational reliability. Since the channel allocations are no longer based on uncertain planning data, but on reliable experience, the number of lost calls will drop and the quality of the calls will enhance.

In this manner it is also possible for such a radio network to adapt itself to modified propagation and traffic requirements without a renewed planning.

Further advantageous embodiments are stated in the dependent claims.

These and other aspects of the invention will be apparent from and elucidated with reference to the embodiments described hereinafter.

DETAILED DESCRIPTION OF THE PREFERRED EMBODIMENTS

Figure 1:
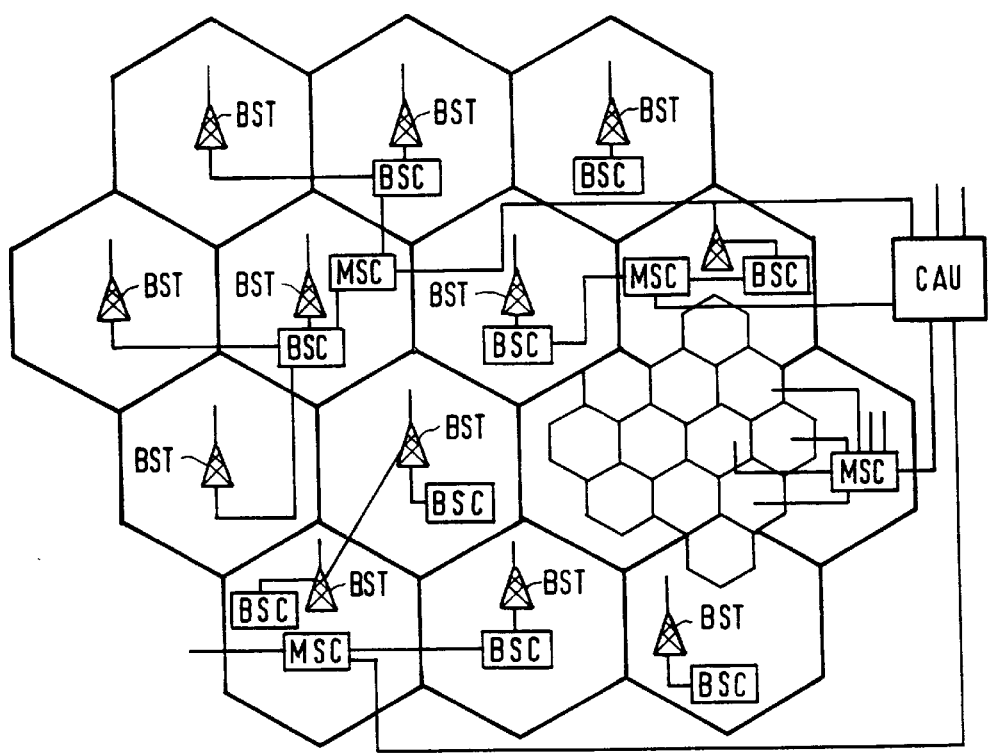
FIG. 1 shows an illustrative embodiment of a cellularly structured mobile radio transmission system.

FIG. 1 shows a mobile radio transmission system comprising radio base stations i.e. base station transceivers (BST). One or even more radio base stations (BST) are controlled by a base station controller (BSC). The base station controllers BSC are again connected via data lines to mobile switching centres MSC. In the mobile switching centres MSC are transferred the radio calls to the public cable-bound telecommunications network. Furthermore, there is provided a channel allocation unit (CAU) connected to the mobile switching centre.

For a further description of the function of the mobile radio transmission system, reference be made, for example, to EP 585 994 A2 mentioned above.

Figure 2:
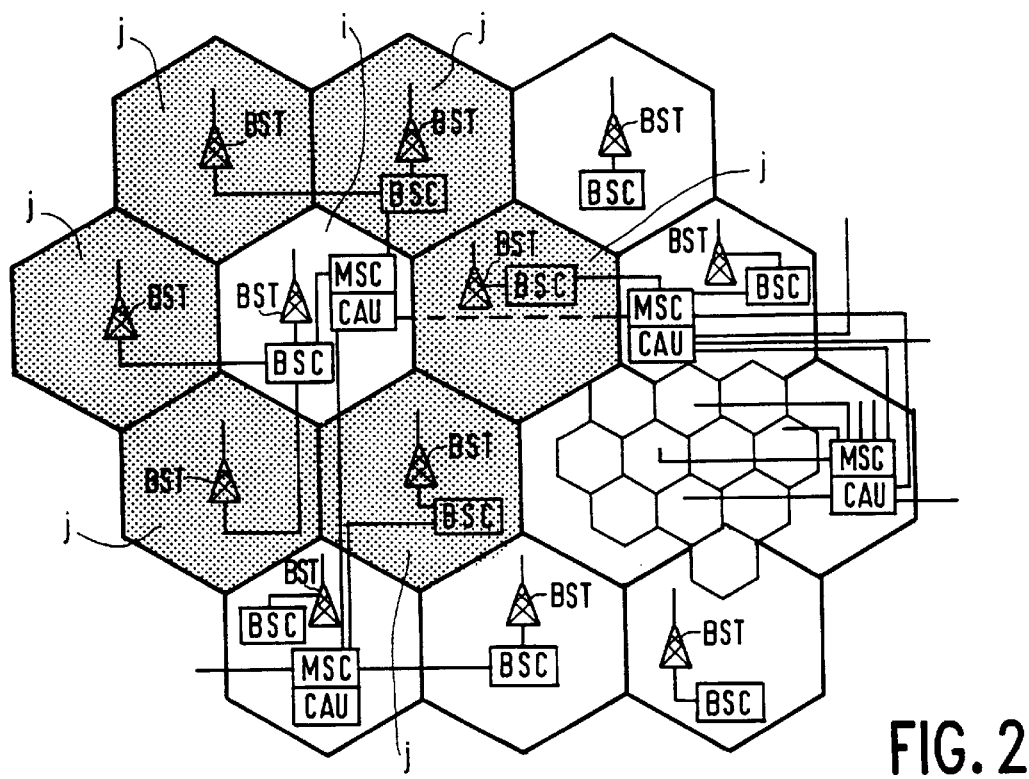
FIG. 2 shows a further illustrative embodiment of a cellularly structured mobile radio transmission system.
Figure 3:
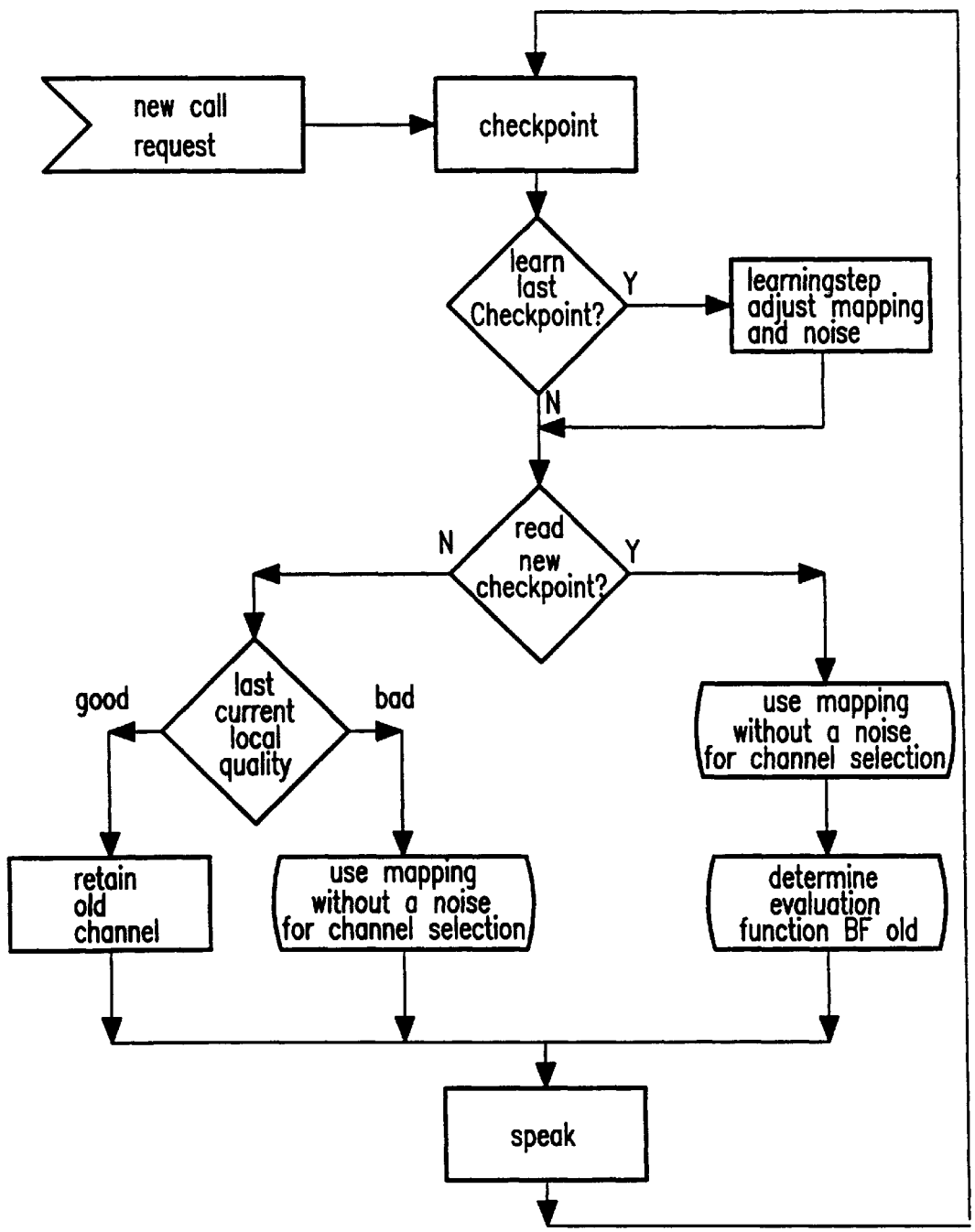
FIG. 3 shows a flow chart for controlling a real-time channel allocation.
Figure 4:
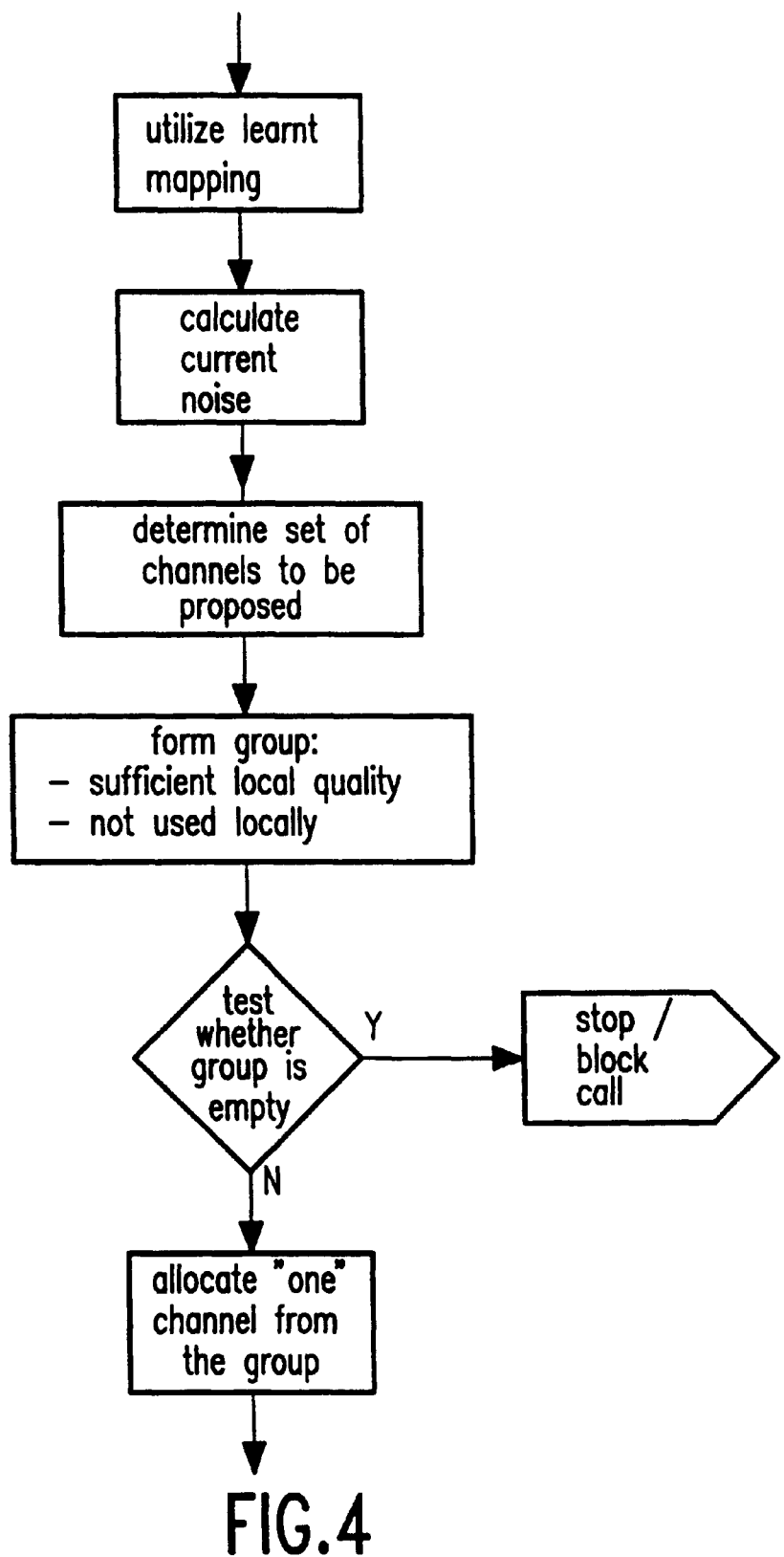
FIG. 4 shows a flow chart in which a learnt mapping with a noise is utilized.
Figure 5:
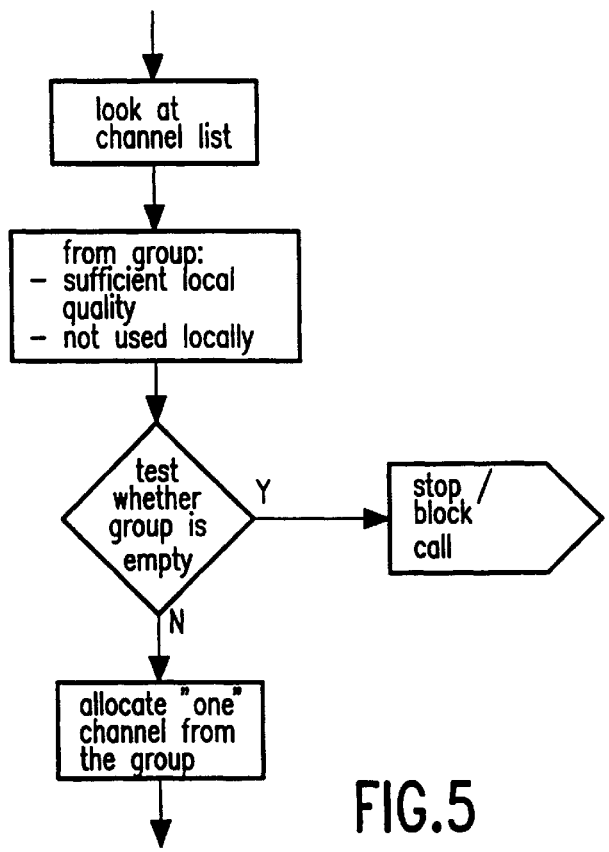
FIG. 5 shows a flow chart in which the learnt mapping without a noise is utilized.
Figure 6:
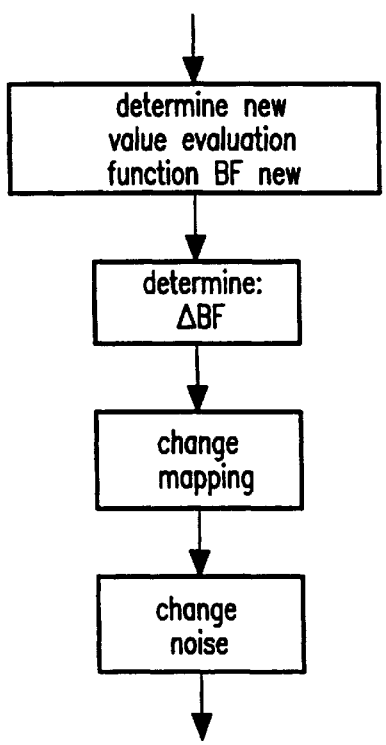
FIG. 6 shows a flow chart for utilizing a learning step.

FIG. 2 shows a further embodiment for a cellular mobile radio transmission system. In essence, the reference characters already used in respect of FIG. 1 are used here too. For a description of the function of the mobile radio transmission system reference be also made to EP 585 994 A2.

Description of the Method

Presuppositions

There are n radio base stations and a total of m available channels, while each radio base station $j \in \{1, \ldots, n\}$ can utilize each channel $i \in \{1, \ldots, m\}$.

Each radio base station generally comprises a plurality of channel lists whose number is dynamically determined in response to the number of different radio situations found at the particular radio base station at that instant. In addition, each radio base station comprises base station controllers with the aid of which it can make changes in these channel lists. The channel lists and their base station controllers may be kept locally at the radio base stations, or globally at a central location. Additionally, any use is possible that lies between these two extremes.

There is a component that contains the currently learnt channel allocation. It may be kept, for example, centrally (MSC) or decentrally (BSC).

There are communication links between the base station controllers and the learnt component, which links convey at regular intervals the part of the channel allocation actually learnt thus far which is interesting to the radio base station. In addition, there are suitable synchronization mechanisms that control the access to the learnt component if, as a result of new events, the channel allocation learnt thus far is to be changed.

Component survey

The two components of the proposed method are:
1. Dynamically learnt mapping for the channel allocation
2. Real-time channel allocation component.

It is necessary to make quality checks at regular intervals, because channel allocations of insufficient quality may occur during dynamic learning at the beginning and also when there are network changes. The real-time component then accordingly reacts to the results of all the checks with a call handover, a blocked call or a lost call. To save computing time and system overhead, the learning component generally utilizes only a part of the checks.

Real-time component

An instance of the real-time component is created for each call. The real-time component controls the current channel allocation at each check point. It then examines, in essence, the local quality of the currently used channel and provides that there is a change of channels if the channel quality is insufficient. The local channel quality is evaluated based on the following criteria:

1. If it is a new call (call request), by means of channel sensing.
2. Otherwise, by means of the bit error rate BER and signal strength.

In addition, the real-time component causes the learning component to be activated. To save on computing time and system overhead, this activation takes place only for part of the check points. Accordingly, the real-time component distinguishes two types of check points:

1. The check point that is used only to ensure that the local quality is sufficient,
2. The check point that additionally triggers the learning component: The time interval up to the next check point is used for learning by the learning component.

In accordance with the subdivision of the check points into two categories, there are different reactions also for the case where a change of channel is necessary when the channel quality is too low.

1 No learning:

The real-time component utilizes the channel list assigned to the concrete radio situation to find a new channel. This corresponds to the use of the learnt mapping without a noise.

2. Learning:

The real-time component does not utilize the channel list assigned to the concrete radio situation to find a new channel. Instead, it utilizes a learning step. For this purpose, it utilizes the central mapping learnt thus far and adds a noise thereto. This corresponds to a stochastic search in the search space of all possible channel lists. The central mapping (the learnt channel allocation) is then to be blocked for all other calls for the next time interval.

The flow charts shown in FIGS. 3 to 6 diagrammatically represent this operation.

Learning the mapping for the channel allocation.

The proposed method of learning the channel allocation is based on an application of the general formulation of the extended Kohonen networks (see chapter 5) to the objective of allocating channels to radio situations within a radio network. The variant of the unmonitored learning is then utilized, see Appendix (Section 5.1.2).

Especially the problem-dependent parameters of the Kohonen formulation are to be adapted for this purpose to the problem of the channel allocation. First a suitable encoding of the input and output spaces is indicated together with possible metrics thereof. Subsequently, there is discussed the search for the set of channel lists in the output space. In essence, a general method for this search is presented, the stochastic search. Finally, the evaluation function is described. The evaluation function may be understood to be the answer of the radio network to a channel list proposal. Thereto the possible criteria will be discussed according to which an evaluation can take place.

The remaining parameters of the general Kohonen formulation can be directly transferred to our application.

Determination of the definition and value ranges V and U and associated metrics

1. The input set V of the extended Kohonen networks consists of $(SS^n, CS^m)$ where:
   a) $ss = (ss_1 \ldots ss_n) \in SS^n$ is an n-vector which indicates for the current radio location the signal strength received from each radio base station (by the reference channel).
   b) $cs = (cs_1 \ldots cs_m) \in CS^m$ is an m-vector which indicates for the current radio location the noise activity on each channel i, current channel situation. Each logical channel then physically denotes a channel pair (uplink, downlink).

Note:
Between the two cases there must be made a distinction in that a new call is to be allocated and an old call is to be examined. If a new call is to be allocated, all the channels available in the radio network can be evaluated via channel sensing. If a current call is examined, the appropriate channel cannot be tested via channel sensing. In that case it is possible to make do with the bit error rate.

In the following $v=(ss,cs)=(ss_1 \ldots ss_n, cs_1 \ldots cs_m) \in V$ is called the current radio situation.

2. The output set $U=\{(0, 1)\}^m$ of the Kohonen network comprises m-vectors $u=(ch_1, \ldots, ch_m) \in \{(0,1)\}^m$, which determines, in dependence on the current radio situation, the set of channels that can be used in this radio situation.

Note:

The real-time component is to be capable of converting the continuous information $u \in \{(0,1)\}^m$ into discrete information which can then be interpreted as a channel list.

0 Channel i must not be used in this radio situation.

1 Channel i can be used in this radio situation.

Formulations from the field of fuzzy logic can specifically be used for this purpose. The rounding-up or rounding-down represents the simplest form of discretization:

$$\lfloor u+(0.5, \ldots 0.5) \rfloor \in \{0,1\}^m$$

Suitable metrics are to guarantee that input vectors which are mutually distinguished at one position only, or input vectors which are mutually distinguished in several positions, but only very few, are close together in the metric. The same requirement also holds for the output space of the set of all the possible channel lists i.e. channel lists which differ by only one channel input are to be very close together. In this respect there is also to be guaranteed that the distance of the empty channel list to each channel list is proportional to the potency of the channel list. The euclidean norm or the Hamming space respectively, represents suitable metrics in this respect.

Illustration and control of the granularity

The mapping to be learnt can be defined as follows:

$$(SS^n, CS^m) \rightarrow U$$

Note:

The real-time component makes this into the following mapping:

$$(SS^n, CS^m) \rightarrow \{0,1\}^m$$

For this purpose, the high-dimensional space $(SS^n, CS^m)$ is shown on a two-dimensional plane. The learnt mapping of the current radio situation (current radio location and current channel situation) on a two-dimensional grid point maintains the neighbourhood and thus the continuity. This two-dimensional plane is naturally crumpled up in reality and represents in a suitable manner neighbourhood relations of the individual radio situations.

Furthermore, an allocation of sets of usable channels to concrete grid points in the neural card is learnt via the interpretation that the channels occurring in this set can be used in this concrete radio situation. The learning of these output vectors then benefits considerably from the space-dependent arrangements of the radio situations on the two-dimensional neural card which maintains the neighbourhood and thus the continuity.

From a graphic point of view, the two dimensions of the neural card are determined by the number of channels that can be used in the radio network (number of different channel situations), or by the number of radio base stations existing in the radio network, respectively (number of different radio areas). For this reason, the number of neurons is determined by $$\#\text{neurons}=k \cdot n \cdot l \cdot m,$$

where the factors k and l determine the granularity of the neural card. Large values for k result, for example, in that a great many different radio locations in the neural card can be identified or are assigned different channel lists.

Figure 7:
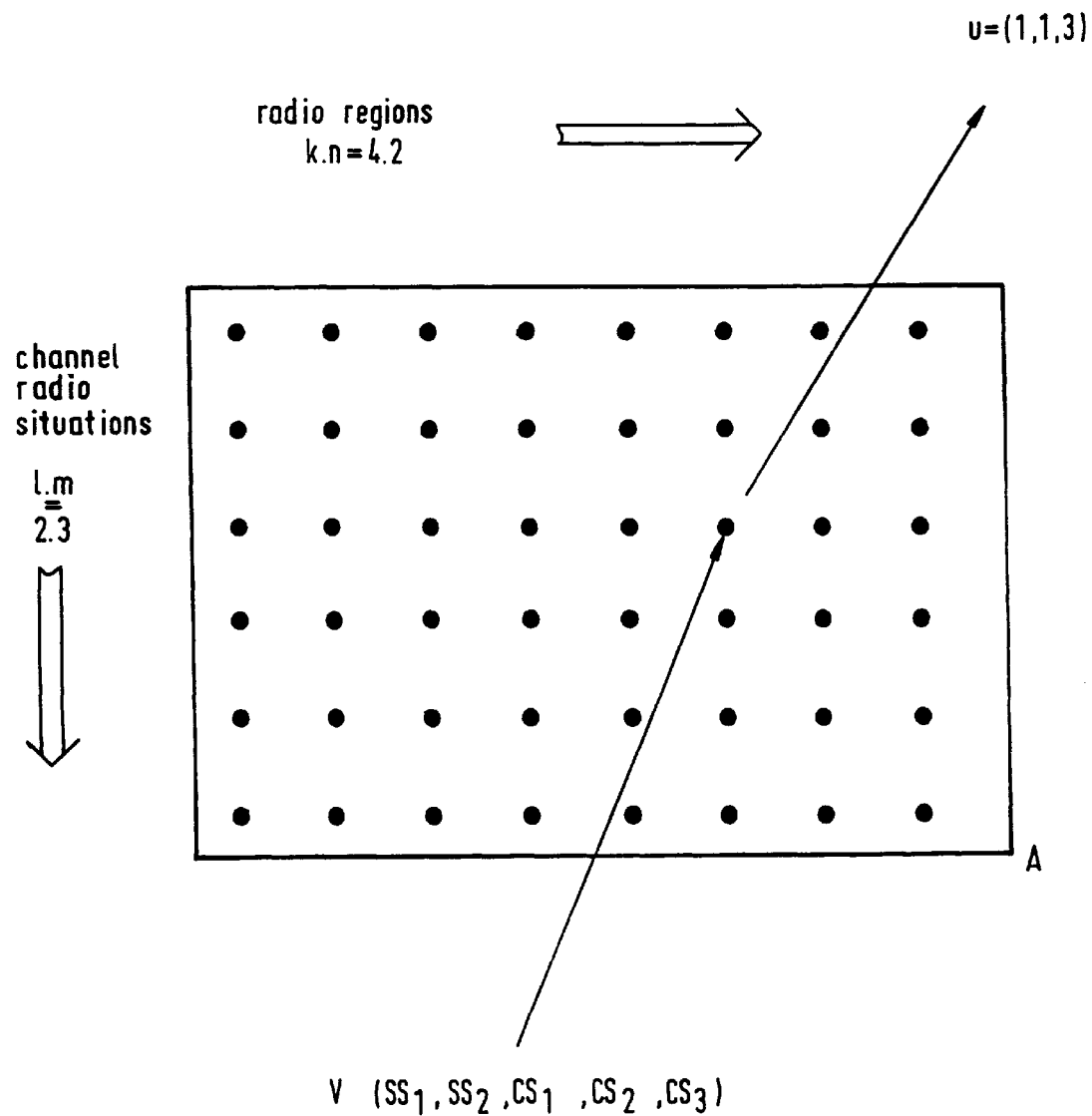
FIG. 7 shows a topology-containing card for the channel allocation.

FIG. 7 illustrates these facts.

Stochastic search

The objective reads passing at random through the output space, i.e. the number of all possible channel lists through with the object of finding an optimum channel list for the predefined input configuration. In the most general and simplest case this may be effected via a stochastic search. For this purpose, for example:

1. A can be assigned an m-dimensional vector of Gauss-distributed random variables $\lambda$ having the average value 0 and variance 1.

2. and an m-dimensional vector $\alpha_s$ of search step sizes with the following interpretation:

$\alpha_{si}$ gives for the neuron s the current search increment of the channel to be learnt at the $i^{th}$ position.

The search step size indicates how long the search is to be made. Naturally, this parameter is very large at the beginning and converges towards the end. To make it possible for the mapping to adapt to any changes, this value should never converge completely and be increased, as required (system change, see section on plasticity, Section 4.4.6).

$$U^{proposal}:=(w_s^{out} \cdot \alpha_s \cdot \Lambda)_{[0,1]}$$

where $0_{[}0,1]$ is defined as follows as regards its components:

$$(x)_{[0,1]} := \begin{cases} 1, & \lfloor x \rfloor > 0 \text{ and } x = \lfloor x \rfloor \\ x - \lfloor x \rfloor, & \text{otherwise} \end{cases}$$

Here * denotes the multiplication of vectors and components and $\lfloor \ \rfloor$ denote the lower Gaussian brackets. Graphically, the stochastic search may be considered a noise of the mapping learnt thus far.

Evaluation function

After a channel has been selected and utilized, the network response of the system is evaluated. For this purpose, there is an evaluation function R which, speaking in abstract terms, allocates a cost value to the whole radio network. This value is oriented on the concrete definition of the concrete objective. For example, this definition of the objective may be to minimize the overall noise in the radio network and, simultaneously, to fulfil the traffic requirements and uniformly distribute the channel load per radio base station respectively, etc. The evaluation is then always made in synchronism with exactly one call. For this reason, the learning component for the other calls is to be blocked during this period of time.

If, for example, one is interested in the minimization of the overall noise and simultaneous fulfilment of the traffic requirements in the radio network, a concrete evaluation function R is defined, which at the current instant:

1. indicates the valid overall noise activity of the radio network, where:

(a) R takes all the channels and all the radio base stations into consideration, and (b) R computes the noise activities based upon channel quality statements (bit error rates, signal-to-noise ratios etc.), and 2. R simultaneously takes into consideration the shortages with the provided traffic requirements.

A deterioration of the evaluation function up to a specific threshold can also be included as an extension of this evaluation function.

Adaptation of the mapping

The adaptation of the mapping i.e. of the adaptation step of the synapse strengths may be taken directly from the Kohonen formulation. There should be observed that the distance function $h_{rs}$ represents a parameter which can regulate the plasticity of the system, see Section 5.1. To begin with, the distance function is set in such a way that the radius of the neurons affected by the adaptation is very large. This radius then decreases as the convergence increases. To allow adaptations to possible changes of the radio network, this radius must never disappear completely, it must even be possible to increase this radius, as required.

Adaptation to changes in time

As has already been mentioned in the previous sections, the parameters:

1. learning step size and
2. distance function include the possibility of controlling the plasticity of the system. With respect to the channel allocation, this means that:

These parameters must never be set such that the system has adopted a converged state, which would correspond to a frozen channel allocation. The possibility should rather be maintained to loosen up these parameters as required to make an adaptation of the channel allocation to the new radio network changes possible.

Indicators for a change of the radio network are therefore to be monitored:

1. Average channel need per radio base station changes or radio situation changes.
2. Global or local noise level changes.

Extensions

1. Noises which will develop as a result of noise may be active or passive. There is active noise when a mobile station (radio base station) is interfered by another mobile station (radio base station). Passive noise describes the situation in which a mobile station (radio base station) causes noise to occur in another mobile station (radio base station). If only the local effect i.e. the active noise is taken into consideration, the learning may be monitored (see section 5.1.1). In that case there may already be made a statement about active noise based on the input set itself. If the signal strength of the radio base station (in whose radio coverage area the mobile station is at that moment) is compared with all the channel qualities (channel situations), while a threshold value is used that indicates the minimum permissible signal-to-noise ratio C/I, there may be locally decided which channels can currently be used. This list of usable channels represents a control action u which is produced by the teacher. The learnt result would be a able whose inputs would be differently fine in accordance with the distribution of the input values. This would generally not lead to a global optimization of the radio network, but only to a local optimization.
2. The change of the learning component has thus far always been effected in synchronism with a call. This may be changed with the object of making both time-dependent and space-dependent integration possible (summation of time windows in a mobile station, summation of various simultaneous calls).
3. The evaluation function may be expressed in more general terms. The following criteria may be incorporated in the evaluation:
   (a) Local loads of radio base stations
   (b) Traffic to the fixed network
   (c) Stability (number of handovers)
4. The evaluation function can be subdivided from a global value into a number of local values:
   (a) as an n-dimensional vector, which contains the noise information per radio base station,
   (b) as an m-dimensional vector, which contains the noise information per channel. The evaluation of the increase might then be adapted accordingly. In this manner there would be a greater degree of freedom for the evaluation function.
5. The input space U can be restricted, so that the field strengths of all the radio base stations are no longer taken into consideration, but only from a group of radio base stations, especially only the neighbouring stations.
6. The dimension of the neural cards in the extended Kohonen network may be increased by several dimensions.

Appendix: Extended Kohonen network

The background for an extended Kohonen network is formed by neuroinformation technology. The mapping of sensory input signals in the memory and also the complementary objective of controlling the muscular system plays a central role.

The Kohonen model represents an abstraction of the brain as a topology-containing neural card. The objective of this neural card is then to establish as good a two-dimensional mapping as possible of the mutual neighbourhood relations of the input signals. On the other hand, this neural card is considered a motor card in which motion commands (control actions) are depicted at two-dimensional (excitation-) locations in the card.

There should further be observed that the Kohonen network learns only via the successfully proposed actions.

Furthermore, there should be observed that the problem itself of controlling the plasticity is not discussed.

Algorithm

Basically, there are considered a multidimensional space V of input stimuli or input signals respectively, $v=(v_1, \ldots v_1)$ and a two-dimensional neural grid (network) A of formal neurons. According to the statistical distribution of the input stimuli, a point v is applied to the network as a stimulus. This leads to the selection of an excitation centre s in the neural grid A. The location s is then determined exclusively based upon the external input signals v, where s represents the location of maximum excitation. All the neurons in the neighbourhood of this excitation centre then take part in an adaptation step. This adaptation step consists of a shift of the weight factors (synapse strengths) $w_r^{in}=(w_{r1}^{in}, \ldots, w_{r1}^{in})$ towards v. The extent of this shift is, in essence, determined by a distance function $h_{rs}$. The excitation response $h_{rs}$ determines the size of the neighbouring zone and thus the range of the interaction between input stimulus and the neurons included in an adaptation step. The extent of the shift decreases as the distance from the centre s increases. Furthermore, a learning step $\in$ also influences the extent of the shift. Additionally, in the case of neural cards which are intended to be used for control objectives, an output value or output vector $w_r^{out}$ belongs to each neuron r. The total of all the $w_r^{out}$ forms an occupation of the grid with values of a second space U (generally multidimensional). In that case the stimulus comprises not only an input stimulus v, but also a control action u∈U. According to the adaptation step for the synapse strengths, there is now also an adaptation step for the output vectors which step now comprises, in essence, a shift of the output vectors $w_r^{out}$ to u.

The following mappings are now distinguished:

$$\Phi_w^{in}: V \to A, v \in V \to S := \phi_w^{in}(v) \in A$$

and $$\Phi: V \to U, v \to \Phi(v) := w^{out}_{\phi_w^{in}(v)}$$

Figure 8:
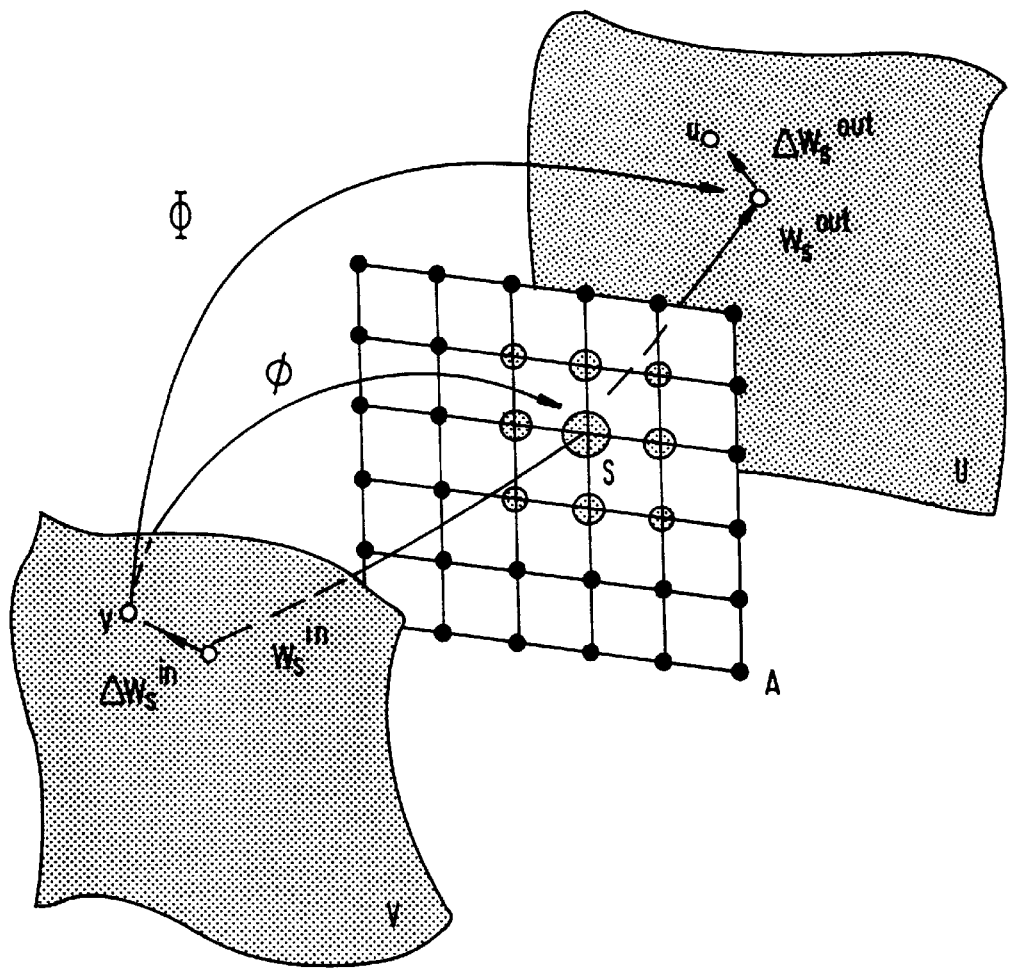
FIG. 8 shows a basic circuit diagram of the extended Kohonen model.

FIG. 8 illustrates these facts.

When the mappings just discussed are learnt, a distinction can be made between two types 1. Learning with instruction:
   The neural network receives as an input the overall control action (v,u). This is also referenced as learning with a teacher. The object is then gradually to replace the teacher, so that the network can finally utilize the learnt mapping autonomously.

2. Learning without instruction:
   The neural network receives as an input not the overall control action (v,u), but only the input stimulus v. Learning now takes place based on an evaluation function R. Contrary to the learning with a teacher, the evaluation function no longer indicates which control action u is to be selected, but only how well the achieved state satisfies the objective. The objective of learning is that a control action u is discovered that leads to a maximum increase of the evaluation function R. Most universally, this is effected by a stochastic search process.

Learning with instruction

The concrete algorithm then looks as follows:

1. Initialization:
   Start with suitable initial values for the synapse strengths $w_r^{in}$ and output vectors $w_r^{out}$. In the absence of any a priori information signals, these values may be selected at random.

2. Selection of stimulus for the input:
   In accordance with the probability density P(v), a random vector v is selected which is applied to the neural network as a sensory signal.

3. Determination of the excitation centre:
   For v the excitation centre becomes $s := \phi_w^{in}(v) \in A$ in the card A, according to the following condition:

$$\sum_p w_{sp}^{in} v_p = \max_r \sum_p w_{rp}^{in} v_p$$

4. Selection of stimulus for the output:
   The control action u is rendered available by the teacher. The teacher then supplies the control action u desired for the input signal v. In all, the complete stimulus (v,u) can be applied to the neural network.

5. Adaptation step of the synapse strengths:
   For the synapse strengths a learning step is made:

$$w_r^{in} := w_{rp}^{in} + \in h_{rs}(v - w_r^{in})$$

6. Adaptation step of the output vectors:
   For the output vectors a learning step is made:

$$w_r^{out} := w_r^{out} + \in' h'_{rs}(u - w_r^{out})$$

Note:
The adaptation step for the output vectors generally uses a learning step length ∈' of its own and a distance function $h'_{rs}$ of its own. In concrete cases these magnitudes may be identical for the two adaptation steps.

Learning without instruction

The basic difference to learning with instruction consists of the fact that now the control action u is not predefined by a teacher. Rather an evaluation function R is used for learning. R no longer indicates which control action u is to be selected, but only how good or how bad the realised state fulfils the desired objective. The most general way of finding a control action u that leads to a large increase of the evaluation function is the stochastic search. In this context the following magnitudes per neuron s play an essential role:

1. Search step size:
   The search step size as controls the stochastic search. A possibility of proposing a new u is to change stochastically the output vector $w_s^{out}$ found thus far:

$$u^{proposal} := w_s^{out} + \alpha_s \Lambda$$

Λ:=(λ..., λ) is then a dim(U)-vector determined by individual gaussian distributed random variables λ. The average size of the search step for the neuron s is then determined by $\alpha_s > (0, \ldots, 0)$. This means that $\alpha_{si}$ for an $i \in \{1, \ldots, \dim(U)\}$ determines the search step size for the neuron s for the $i^{th}$ output value.

2. Evaluation function:
   The evaluation function R indicates how well a proposed control action $u^{proposal}$ satisfies the set objective. If the objective is considered an optimization objective, the evaluation function R represents the problem-dependent formulation of the posed objective as a cost function whose optima are sought.

3. Average achieved evaluation increase:
   The objective of the neural network is to improve gradually until the desired mapping is learnt and thus a stable state has set in. For this reason the network is only interested in those control actions that represent an improvement. At a current point in time, there must then be decided on a neuron-to-neuron base whether a proposed control action $u^{proposal}$ represents an improvement of the performance made thus far by the neural network or not. Therefore, the evaluation increase ΔR implied by the evaluation function R is to be updated for each neuron s. For this purpose, $b_s$ contains the average evaluation increase for neuron s realised up to the current instant. The concrete algorithm for learning without instruction differs from the previous learning with instruction only at item 4.

1. Initialization:
2. Stimulus selection for the input:
3. Determination of the excitation centre:
4. Stimulus selection for the output:
   Control action u is proposed and evaluated:
   (a) Generation of a proposal for control action: Stochastic generation of a proposal $u^{proposal}$ for the next control action:

$$u^{proposal} := w_s^{out} + \alpha_s \Lambda$$

(b) Calculation of the current evaluation increase: Based upon $u^{proposal}$ the current evaluation increase ΔR is calculated.

(c) Test of the acceptance of the proposal:

The proposed control action $u^{proposal}$ is tested on whether it represents an improvement of the performance achieved thus far by the neural network. Only if the evaluation increase $\Delta R$ achieved thus far by $u^{proposal}$ exceeds the average increase $b_s$ achieved by the neuron s thus far, an adaptation of the neural network is made.

(d) Updating of the achieved average evaluation increase of the current neuron:

After each selection of a neuron s, the average achieved evaluation increase $b_s$ of the neuron up to this point in time is updated based upon the really achieved evaluation increase $\Delta R$. In its simplest form this may be achieved, for example, by the following instruction:

$$b_s := b_s + \gamma(\Delta R - b_s)$$

This has the effect of a low-pass smoothing of the sequence of the most recently achieved evaluation changes, while the time constant is given by (e) Adaptation rule for search step sizes:

If an adaptation is made, also the search step size $\alpha_s$ is adapted in accordance with items 5 and 6, because also the neighbouring neurons $\tau \neq s$ take part in each adaptation step of s.

$$\alpha_\tau := \alpha_\tau + \in ''h''_{rs}(\alpha - \alpha_\tau).$$

$\alpha$ is then the same for all steps and indicates the limit value. If the $w_r^{out}$ are to converge, one selects $\alpha = (0, \ldots, 0)$.

In all, the stimulus (v,u) is now applied to the neural network.

5. Adaptation step of the synapse strengths:
6. Adaptation step of the output vectors:
20. Literature:
  H. Ritter, T. Martinez and K Schulten: Neurale Netze; Eine Einführung in die Neuroinformatik selbstorganisierender Netzwerke; Addison-Wesley 1990.

What is claimed is:

1. A radio transmission system comprising:
a base station;
a mobile station; and
controller which dynamically changes allocation of channels between said base station and said mobile station in response to changes in signal propagation and traffic conditions between said base station and said mobile station, wherein said allocation of channels is based on use of a Kohonen model.

2. The radio transmission system of claim 1, wherein said allocation of channels is determined by at least one of a space-dependent component and a time-dependent component.

3. The radio transmission system of claim 2, wherein said space-dependent component is determined by signal strengths received by said base station and said mobile station and said time-dependent component is determined by activity of said channels.

4. The radio transmission system of claim 1, wherein said controller chooses said channels from a channel list assigned to said base station and said mobile station.

5. The radio transmission system of claim 1, wherein said controller chooses said channels from all channel lists available to said base station and said mobile station.

6. The radio transmission system of claim 1, wherein said controller includes a channel allocation component for allocating said channels in real-time and a learning component; said channel allocation component replacing a currently used channel with a new channel, said new channel being selected from one of an assigned channel list assigned to said base station and total channel lists available to said base station; and said learning component forming said assigned channel list from learned mapping without noise and forming said total channel lists from said learned mapping with said noise.

7. The radio transmission system of claim 6, wherein said controller blocks said learning component during evaluation of said new channel.

8. A controller for a radio transmission system having a base station and a mobile station, said controller comprising a channel allocator which dynamically changes allocation of channels between said base station and said mobile station in response to changes in signal propagation and traffic conditions between said base station and said mobile station, wherein said channel allocator dynamically changes allocation of said channels based on a Kohonen model.

9. The controller of claim 8, wherein said channel allocator dynamically changes allocation of said channels based on at least one of a space-dependent component and a time-dependent component.

10. The controller of claim 9, wherein said space-dependent component is determined by signal strengths received by said base station and said mobile station and said time-dependent component is determined by activity of said channels.

11. The radio transmission system of claim 8, wherein said channel allocator chooses said channels from a channel list assigned to said base station and said mobile station.

12. The radio transmission system of claim 8, wherein said channel allocator chooses said channels from all channel lists available to said base station and said mobile station.

13. The controller of claim 8, further comprising:
a learning component; and
a channel allocation component for allocating said channels in real-time, said channel allocation component replacing a currently used channel with a new channel;
wherein said new channel is selected from one of an assigned channel list assigned to said base station and total channel lists available to said base station; and
wherein said learning component forms said assigned channel list from learned mapping without noise and forms said total channel lists from said learned mapping with said noise.

14. The controller of claim 13, wherein said controller blocks said learning component during evaluation of said new channel.

15. A radio transmission system comprising:
a base station;
a mobile station; and
a controller which dynamically changes a channel of communication between said base station and said mobile station if quality of said channel degrades, wherein said controller replaces said channel with a new channel based on use of a Kohonen model.

16. The radio transmission system of claim 15, wherein said quality degrades in response to changes in signal propagation and traffic conditions between said base station and said mobile station.

17. The radio transmission system of claim 15, wherein said quality is a measure of one of a bit rate error and strength of signals exchanged between said base station and said mobile station.

18. The radio transmission system of claim 15, wherein said controller chooses said channel from a channel list assigned to said base station and said mobile station.

19. The radio transmission system of claim 15, wherein said controller chooses said channel from all channel lists available to said base station and said mobile station.

20. The radio transmission system of claim 15, wherein said controller includes a channel allocation component for allocating said channels in real-time and a learning component;

said channel allocation component replacing a currently used channel with a new channel, said new channel being selected from one of an assigned channel list assigned to said base station and total channel lists available to said base station; and said learning component forming said assigned channel list from learned mapping without noise and forming said total channel lists from said learned mapping with said noise.

21. The radio transmission system of claim 20, wherein said controller blocks said learning component during evaluation of said new channel.

* * * * *